United States Patent [19]

Matsuda et al.

[11] Patent Number: 5,773,169
[45] Date of Patent: Jun. 30, 1998

[54] ACTIVE MATERIAL AND POSITIVE ELECTRODE FOR ALKALINE STORAGE BATTERY

[75] Inventors: Hiromu Matsuda, Kawabe-gun; Yukihiro Okada, Katano; Kazuhiro Ohta, Sanda; Yoshinori Toyoguchi, Yao, all of Japan

[73] Assignee: Matsushita Electric Industrial Co., Ltd., Osaka-fu, Japan

[21] Appl. No.: 802,156

[22] Filed: Feb. 19, 1997

[30] Foreign Application Priority Data

Feb. 29, 1996 [JP] Japan ..................................... 8-043294

[51] Int. Cl.⁶ ..................................................... H01M 4/32
[52] U.S. Cl. ........................................... 429/223; 429/218
[58] Field of Search ..................................... 429/223, 206, 429/218; 252/182.1; 428/457, 546, 570, 680

[56] References Cited

U.S. PATENT DOCUMENTS 5,348,822  9/1994  Ovshinsky et al. .
5,523,182  6/1996  Ovshinsky et al. ..................... 429/223

FOREIGN PATENT DOCUMENTS 0 696 076 A1  2/1996  European Pat. Off. .
0 712 174 A2  5/1996  European Pat. Off. .
4439989  5/1996  Germany .
04-179056 A  6/1992  Japan .
07-037586 A  2/1995  Japan .
07-045281 A  2/1995  Japan .
WO 96/09657  3/1996  WIPO .

OTHER PUBLICATIONS

L. Indira et al.; "Electrosynthesis of Layered Double Hydroxides of Nickel With Trivalent Cations"; Journal of Power Sources 52 (1994) pp. 93 –97 (No Month).

C. Delmas et al.; "The Effect of Cobalt on the Chemical and Electrochemical Behaviour of the Nickel Hydroxide Electrode" Materials Science and Engineering, B13 (1992) pp. 89–96 (No Month).

*Primary Examiner*—Anthony Skapars
*Attorney, Agent, or Firm*—Panitch Schwarze Jacobs & Nadel, P.C.

[57] ABSTRACT

The present invention provides a high performance composite hydroxide active material which facilitates charging at high temperatures. It comprises a solid solution nickel hydroxide material having additive elements incorporated therein. The additive elements comprise at least one element selected from group A consisting of Fe, Cr, V, Ti, Y, La, Ce, Al, and Pb, and at least one element selected from group B consisting of Mn and Co.

5 Claims, No Drawings

ACTIVE MATERIAL AND POSITIVE ELECTRODE FOR ALKALINE STORAGE BATTERY

BACKGROUND OF THE INVENTION

The present invention relates to a nickel hydroxide active material and a positive electrode using the same for alkaline storage batteries.

Conventionally, composite hydroxides prepared from nickel hydroxide dissolving one or more elements such as Co, Al, Mn, Fe, Cr, etc. in solid solution have been focused on to realize a nickel hydroxide active material having a high capacity (C. Delmas, et al.: Materials Science and Engineering, B13, 89–96 (1992) and L. Indira, et al.: Journal of Power Sources, 52, 93–97 (1994).

In these methods, part of element Ni included in the nickel hydroxide active material is substituted with Co, Al, Mn, Fe, Cr, or the like, thereby to cause an exchange of more than one electron in the oxidation-reduction reaction of the nickel hydroxide, rather than only one electron that is normal in an alkaline solution.

The prior art technologies have the following drawbacks:

Oxidation-reduction equilibrium potential of the composite hydroxide active material is likely to vary depending on the species of elements to be substituted for element Ni. This means that charge and discharge potentials vary at the same time. Selection of an element which lowers charge potential in order to increase charge efficiency at high temperatures adversely leads to a reduction in discharge potential at the same time. As a result, available discharge energy decreases.

Another drawback is that selection of an element which elevates discharge potential in order to increase discharge energy leads to an elevation of charge potential at the same time. This causes a small difference between the charge potential and oxygen evolution potential, and the charge efficiency at high temperatures decreases.

BRIEF SUMMARY OF THE INVENTION

The present invention provides an active material for an alkaline storage battery comprising a solid solution nickel hydroxide material having additive elements incorporated therein, the additive elements comprising at least one element selected from group A consisting of Fe, Cr, V, Ti, Y, La, Ce, Al, and Pb, and at least one element selected from group B consisting of Mn and Co.

The positive electrode for an alkaline storage battery in accordance with the present invention comprises the above-mentioned active material and a compound of at least one element selected from the group consisting of Y, Ba, Ca, Sr, Cd, Cu, and Ag.

While the novel features of the invention are set forth particularly in the appended claims, the invention, both as to organization and content, will be better understood and appreciated, along with other objects and features thereof, from the following detailed description.

DETAILED DESCRIPTION OF THE INVENTION

The present invention is based on the following finding:

When at least one element selected from group A consisting of Fe, Cr, V, Ti, Y, La, Ce, Al, and Pb, all of which have a tendency in a solid solution nickel hydroxide material to elevate or maintain the oxidation-reduction equilibrium potential of the nickel hydroxide, and at least one element selected from group B consisting of Mn and Co, which have a tendency to lower the oxidation-reduction equilibrium potential of the nickel hydroxide, are contained together in the solid solution nickel hydroxide material, a minimal decrease in discharge potential can be secured even when the charge potential is decreased greatly.

The present invention can realize a high performance composite hydroxide active material with less impaired discharge characteristic which facilitates charging at high temperatures with exceptional efficiency.

Particularly, a high technical effect can be obtained when each of group A element and group B element occupies 3 mol % or more of the total amount of element Ni, group A element and group B element, and the sum of the contents of group A element and group B element is 50 mol % or less.

Preferably, the sum of the contents of group A element and group B element occupies not less than 10 mol % and not more than 30 mol % of the total amount of element Ni, group A element and group B element.

The nickel hydroxide active material of the present invention can be obtained by a commonly known method of producing a nickel hydroxide powder or a nickel hydroxide electrode plate. More specifically, it can be produced by one of the methods including precipitation, oxide hydrolysis, metal hydroxylation, electrodeposition, various impregnation processes, and the like, which facilitate preparation of a composite solid solution material having additive elements in the solid solution. The active material is obtained as a granulated powder, a thin film, or an electrode plate impregnated with the active material.

The synthesis by precipitation is a representative method of producing a powder. In this method, an aqueous solution dissolving a nickel salt and salts of additive elements is successively supplied into a reaction chamber, together with an alkaline aqueous solution so as to cause nuclear generation and crystalline growth at the same time. This method can give a highly porous spherical composite hydroxide powder. A complex forming agent such as ammonia and the like may be further added at the same time for stabilization of crystalline growth, if necessary.

The above-mentioned additive elements are at least one element selected from the aforementioned group A and at least one element selected from the aforementioned group B. A sulfate or a nitrate is usually used as the salt.

The electrodeposition is a representative method of forming a thin film. By cathodic polarizing an electrode substrate in an aqueous solution of nickel nitrate and nitrates of the additive elements, a composite hydroxide thin film can be formed on the electrode substrate.

The present invention can realize a nickel hydroxide positive electrode with good charge efficiency at higher temperatures, since the positive electrode comprises not solely the aforementioned solid solution nickel hydroxide material having group A element and group B element in the solid solution, but also a compound of at least one element selected from the group consisting of Y, Ba, Ca, Sr, Cd, Cu, and Ag, all of which are known to elevate the oxygen evolution potential.

The positive electrode for alkaline storage batteries in accordance with the present invention can be prepared by a representative process of filling a mixture of the solid solution nickel hydroxide material having group A element and group B element incorporated therein, which was prepared by the above-mentioned precipitation, and a compound of Y or the like, into a substrate, such as a foamed metal substrate, a metallic fiber substrate, and the like.

Preferable examples of the compound of Y or the like may be exemplified as $Y_2(CO_3)_3$, $Y_2O_3$, BaO, $Ca(OH)_2$, CaO, $CaF_2$, CaS, $CaSO_4$, $CaSi_2O_5$, $CaC_2O_4$, $CaWO_4$, $SrCO_3$, $Sr(OH)_2$, CdO, $Cu_2O$, $Ag_2O$, and the like.

It is preferable to contain these compounds not less than 0.1 wt% in order to elevate the oxygen-evolution potential, and not more than 5 wt % because addition of these compounds in larger amounts adversely decreases the capacity of the positive electrode.

The active material and the positive electrode for alkaline storage batteries in accordance with the present invention can be applied to alkaline storage batteries having an electrolyte of an alkaline aqueous solution, such as nickel-cadmium storage batteries, nickel-metal hydride storage batteries including a hydrogen storage alloy negative electrode, nickel-iron storage batteries, nickel-zinc storage batteries, etc.

In the following, the present invention will be described by way of examples.

EXAMPLE 1

A mixture of 800 cc of an aqueous solution of 0.1M $Ni(NO_3)_2$, 100 cc of an aqueous solution of 0.1M $Fe(NO_3)_3$, and 100 cc of an aqueous solution of 0.1M $Co(NO_3)_2$ was poured in an electrolysis vessel. A 0.15-mm-thick platinum substrate for electrolytic deposition (one surface has an area of 10 cm$^2$) and a 0.15-mm-thick nickel substrate serving as a counter electrode (one surface has an area of 100 cm) were immersed in the mixture. Then, the platinum substrate was polarized cathodically for electrolysis for 5 sec at a current of 10 mA/cm$^2$ per surface at room temperature. After electrolysis, the platinum substrate was removed from the vessel, washed with water, and dried at room temperature. The resultant platinum substrate was used as the electrode of Example 1.

EXAMPLE 2

An electrode for Example 2 was prepared in the same manner as applied for Example 1, except for the use of a mixture of 800 cc of an aqueous solution of 0.1M $Ni(NO_3)_2$, 100 cc of an aqueous solution of 0.1M $Cr(NO_3)_3$, and 100 cc of an aqueous solution of 0.1M $Co(NO_3)_2$.

EXAMPLE 3

An electrode for Example 3 was prepared in the same manner as applied for Example 1, except for the use of a mixture of 800 cc of an aqueous solution of 0.1M $Ni(NO_3)_2$, 100 cc of an aqueous solution of 0.1M $V(NO_3)_3$, and 100 cc of an aqueous solution of 0.1M $Co(NO_3)_2$.

EXAMPLE 4

An electrode for Example 4 was prepared in the same manner as applied for Example 1, except for the use of a mixture of 800 cc of an aqueous solution of 0.1M $Ni(NO_3)_2$, 100 cc of an aqueous solution of 0.1M $Ti(SO_4)_2$, and 100 cc of an aqueous solution of 0.1 M $Co(NO_3)_2$.

EXAMPLE 5

An electrode for Example 5 was prepared in the same manner as applied for Example 1, except for the use of a mixture of 800 cc of an aqueous solution of 0.1M $Ni(NO_3)_2$, 100 cc of an aqueous solution of 0.1M $La(NO_3)_3$, and 100 cc of an aqueous solution of 0.1M $Mn(NO_3)_2$.

EXAMPLE 6

An electrode for Example 6 was prepared in the same manner as applied for Example 1, except for the use of a mixture of 800 cc of an aqueous solution of 0.1M $Ni(NO_3)_2$, 100 cc of an aqueous solution of 0.1M $Ce(NO_3)_3$, and 100 cc of an aqueous solution of 0.1M $Mn(NO_3)_2$.

EXAMPLE 7

An electrode for Example 7 was prepared in the same manner as applied for Example 1, except for the use of a mixture of 800 cc of an aqueous solution of 0.1M $Ni(NO_3)_2$, 100 cc of an aqueous solution of 0.1M $Al(NO_3)_3$, and 100 cc of an aqueous solution of 0.1M $Mn(NO_3)_2$.

EXAMPLE 8

An electrode for Example 8 was prepared in the same manner as applied for Example 1, except for the use of a mixture of 800 cc of an aqueous solution of 0.1M $Ni(NO_3)_2$, 100 cc of an aqueous solution of 0.1M $Pb(NO_3)_2$, and 100 cc of an aqueous solution of 0.1M $Mn(NO_3)_2$.

COMPARATIVE EXAMPLE 1

An electrode for Comparative Example 1 was prepared in the same manner as applied for Example 1, except for the use of a mixture of 800 cc of an aqueous solution of 0.1M $Ni(NO_3)_2$ and 200 cc of an aqueous solution of 0.1 M $Co(N0_3)_2$.

COMPARATIVE EXAMPLE 2

An electrode for Comparative Example 2 was prepared in the same manner as applied for Example 1, except for the use of a mixture of 800 cc of an aqueous solution of 0.1M $Ni(NO_3)_2$ and 200 cc of an aqueous solution of 0.1M $Al(NO_3)_2$.

COMPARATIVE EXAMPLE 3

An electrode for Comparative Example 3 was prepared in the same manner as applied for Example 1, except for the use of a mixture of 800 cc of an aqueous solution of 0.1M $Ni(NO_3)_2$, 100 cc of an aqueous solution of 0.1M $Al(NO_3)_3$, and 100 cc of an aqueous solution of 0.1M $Fe(NO_3)_3$.

COMPARATIVE EXAMPLE 4

An electrode for Comparative Example 4 was prepared in the same manner as applied for Example 1, except for the use of a mixture of 800 cc of an aqueous solution of 0.1M $Ni(NO_3)_2$, 100 cc of an aqueous solution of 0.1M $Co(NO_3)_2$, and 100 cc of an aqueous solution of 0.1M $Mn(NO_3)_2$.

COMPARATIVE EXAMPLE 5

An electrode for Comparative Example 5 was prepared in the same manner as applied for Example 1, except for the use of 1,000 cc of an aqueous solution of 0.1M $Ni(NO_3)_2$.

Half cells were prepared using the thus prepared electrodes of Examples 1 through 8, and Comparative Examples 1 through 5 as positive electrodes, hydrogen storage alloy negative electrodes having an excess capacity over the positive electrodes as counter electrodes, mercury electrodes (Hg/HgO) as reference electrodes, and a 31 wt % aqueous solution of KOH as electrolytes. A charge and discharge was performed at a current of 200 μA/cm$^2$/surface of these electrodes. Charging was started upon complete saturation of the charge potential to a constant value and continued for one hour. Discharging was continued up to 0.0 V, with reference to the potential of the reference electrode. In these half cells, the discharge capacities ($C_{10}$) after charging at 10° C. and discharging at 20° C. in an atmosphere and the discharge capacities ($C_{40}$) after charging at 40° C. and discharging at 20° C. in an atmosphere were measured, and a ratio of $C_{40}$ to $C_{10}$ ($C_{40}/C_{10}$) was determined. Intermediate discharge potentials after charging at 10° C. and discharging at 20° C. were also measured, using the discharge potential of the electrode of Comparative Example 5 as reference. The measurement results are summarized in Table 1 below.

TABLE 1

| Positive electrode | Discharge capacity ratio (%) ($C_{40}/C_{10}$) | Intermediate discharge potential difference (mV) (compared to Comparative Example 5) |
|---|---|---|
| Example 1 | 80 | −20 |
| Example 2 | 85 | −20 |
| Example 3 | 85 | −25 |
| Example 4 | 80 | −20 |
| Example 5 | 75 | −15 |
| Example 6 | 75 | −15 |
| Example 7 | 80 | −10 |
| Example 8 | 75 | −15 |
| Comparative Example 1 | 90 | −90 |
| Comparative Example 2 | 50 | +50 |
| Comparative Example 3 | 45 | +55 |
| Comparative Example 4 | 95 | −85 |
| Comparative Example 5 | 65 | 0 |

The above results indicate that inclusions of at least one element selected from group A consisting of Fe, Cr, V, Ti, Y, La, Ce, Al, and Pb in a solid solution nickel hydroxide, which have a tendency to elevate the oxidation-reduction equilibrium potential of the nickel hydroxide, and at least one element selected from group B consisting of Mn and Co in a solid solution nickel hydroxide, which have a tendency to lower the oxidation-reduction equilibrium potential of the nickel hydroxide may facilitate improvement in charge efficiency at high temperatures and prevention of a decrease in discharge potential at the same time.

EXAMPLE 9

An electrode for Example 9 was prepared in the same manner as applied for Example 1, except for the use of a mixture of 940 cc of an aqueous solution of 0.1M $Ni(NO_3)_2$, 30 cc of an aqueous solution of 0.1M $Al(NO_3)_3$, and 30 cc of an aqueous solution of 0.1M $Mn(NO_3)_2$.

EXAMPLE 10

An electrode for Example 10 was prepared in the same manner as applied for Example 1, except for the use of a mixture of 900 cc of an aqueous solution of 0.1M $Ni(NO_3)_2$, 50 cc of an aqueous solution of 0.1M $Al(NO_3)_3$, and 50 cc of an aqueous solution of 0.1M $Mn(NO_3)_2$.

EXAMPLE 11

An electrode for Example 11 was prepared in the same manner as applied for Example 1, except for the use of a mixture of 800 cc of an aqueous solution of 0.1M $Ni(NO_3)_2$, 150 cc of an aqueous solution of 0.1M $Al(NO_3)_3$, and 50 cc of an aqueous solution of 0.1M $Mn(NO_3)_2$.

EXAMPLE 12

An electrode for Example 12 was prepared in the same manner as applied for Example 1, except for the use of a mixture of 800 cc of an aqueous solution of 0.1M $Ni(NO_3)_2$, 50 cc of an aqueous solution of 0.1M $Al(NO_3)_3$, and 150 cc of an aqueous solution of 0.1M $Mn(NO_3)_2$.

EXAMPLE 13

An electrode for Example 13 was prepared in the same manner as applied for Example 1, except for the use of a mixture of 700 cc of an aqueous solution of 0.1M $Ni(NO_3)_2$, 150 cc of an aqueous solution of 0.1M $Al(NO_3)_3$, and 150 cc of an aqueous solution of 0.1M $Mn(NO_3)_2$.

EXAMPLE 14

An electrode for Example 14 was prepared in the same manner as applied for Example 1, except for the use of a mixture of 500 cc of an aqueous solution of 0.1M $Ni(NO_3)_2$, 250 cc of an aqueous solution of 0.1M $Al(NO_3)_3$, and 250 cc of an aqueous solution of 0.1M $Mn(NO_3)_2$.

Half cells were prepared by combining each of the electrodes of Examples 9 through 14 as positive electrodes, with each of the hydrogen storage alloy electrodes and reference electrodes as stated above. Then, the discharge capacity ratio ($C_{40}/C_{10}$) after charging and discharging was measured under the same conditions as applied in the above-mentioned examples, and the intermediate discharge potentials after charging at 10° C. and discharging at 20° C., using the discharge potential of the electrode of Comparative Example 5 as reference. The measurement results are listed in Table 2 below.

TABLE 2

| Positive electrode | Discharge capacity ratio (%) ($C_{40}/C_{10}$) | Intermediate discharge potential difference (mV) (compared to Comparative Example 5) |
|---|---|---|
| Example 9 | 70 | −10 |
| Example 10 | 75 | −10 |
| Example 11 | 70 | −5 |
| Example 12 | 85 | −20 |
| Example 13 | 80 | −10 |
| Example 14 | 70 | −15 |
| Comparative Example 5 | 65 | 0 |

The above results indicate that a higher effect can be obtained when each of group A element and group B element occupies 3 mol % or more of the total amount of element Ni, group A element and group B element, and the sum of the contents of group A element and group B element is not less than 5 mol % and not more than 50 mol %. Furthermore, it is appreciated that a more preferable range of the sum of the contents of group A element and group B element is not less than 10 mol % and not more than 30 mol % of the total amount of element Ni, group A element and group B element.

EXAMPLE 15

Aqueous solutions of 1M $NiSO_4$, 1M $NiSO_4$, 1M $Al_2(SO_4)_3$, and 1M $CoSO_4$ were mixed in a volume ratio of 8:1:1 (Ni:Al:Co=80:10:10 in a metallic ion molar ratio). The resultant mixture was successively supplied into a reaction chamber, together with an aqueous solution of 2M sodium hydroxide and a water containing 2M ammonia, at the same flow rate, using a volume-controlled pump, and the mixture was stirred well continuously. Subsequently, a suspension including active material fine particles and other reaction products, which are successively discharged from the reaction chamber, was centrifuged to isolate the active material fine particles. The isolated fine particles were washed with an alkaline aqueous solution and water and dried at 90° C. The dried particles were used as the active material powder. The active material powder (85 g) was mixed and kneaded with cobalt hydroxide (15 g) having a mean particle diameter of 1.5 μm and a specific surface area of 25 m²/g, while dropping water, and a paste was obtained. The paste was filled into a foamed nickel electrode substrate, and dried and pressed. This gave an electrode having a capacity of 1 Ah.

EXAMPLE 16

An active material powder and an electrode for Example 16 were prepared in the same manner as applied for Example 15, except for the use of a mixture of aqueous solutions of 1M $NiSO_4$, 1M $Al_2(SO_4)_3$, and 1M $MnSO_4$ (Ni:Al:Mn= 80:5:15 in a metallic ion molar ratio).

COMPARATIVE EXAMPLE 6

For comparison, an active material powder and an electrode were prepared separately in the same manner as applied for Example 15, except for the use of an aqueous solution of 1M $NiSO_4$, instead of the mixture of various aqueous solutions.

Similarly, half cells were prepared by combining each of the above-mentioned electrodes of Examples 15 and 16, and Comparative Example 6 as positive electrodes, with each of the hydrogen storage alloy electrodes and reference electrodes as stated above. Then, the discharge capacity ratio ($C_{40}/C_{10}$) after charging and discharging was measured under the same conditions as applied in the above-mentioned examples, and the intermediate discharge potentials after charging at 10° C. and discharging at 20° C., using the discharge potential of the electrode of Comparative Example 6 as reference. The measurement results are listed in Table 3 below.

TABLE 3

| Positive electrode | Discharge capacity ratio (%) ($C_{40}/C_{10}$) | Intermediate discharge potential difference (mV) (compared to Comparative Example 5) |
|---|---|---|
| Example 15 | 80 | −10 |
| Example 16 | 75 | −15 |
| Comparative Example 6 | 60 | 0 |

The above results indicate that the active material powder obtained by the precipitation can have the same technical effect as observed with the above-mentioned active material thin film.

EXAMPLE 17

An electrode was prepared in the same manner as applied for Example 15, using a mixture of the active material powder of Example 15 (84 g), $CaF_2$ (1 g), and the cobalt hydroxide used in Example 15 (15 g).

EXAMPLE 18

An electrode for Example 18 was prepared in the same manner as applied for Example 17, except for the use of $Sr(OH)_2$, in place of $CaF_2$.

Similarly, half cells were prepared by combining each of the above-mentioned electrodes of Examples 17 and 18, and Comparative Example 6 as positive electrodes, with each of the hydrogen storage alloy electrodes and reference electrodes as stated above. Then, the discharge capacity ratio ($C_{40}/C_{10}$) after charging and discharging was measured under the same conditions as applied in the above-mentioned examples, and the intermediate discharge potentials after charging at 10° C. and discharging at 20° C., using the discharge potential of the electrode of Comparative Example 6 as reference. The measurement results are listed in Table 4 below.

TABLE 4

| Positive electrode | Discharge capacity ratio (%) ($C_{40}/C_{10}$) | Intermediate discharge potential difference (mV) (compared to Comparative Example 6) |
|---|---|---|
| Example 17 | 93 | −10 |
| Example 18 | 90 | −10 |
| Comparative Example 6 | 60 | 0 |

The above results indicate that the composite nickel hydroxide positive electrode including an active material comprising the solid solution nickel hydroxide as a main component and further comprising, as additives, element Al selected from group A and element Co selected from group B in the solid solution, and a Ca— or Sr— compound has exceptional charge efficiency at high temperatures, with less decrease in discharge potential.

In the above examples, although Al and Co were specifically used as the additive elements incorporated into the nickel hydroxide, and a compound of Ca or Sr as a compound mixed with the nickel hydroxide, a substantially similar effect may be obtained by a combination of different elements of group A consisting of Fe, Cr, V, Ti, Y, La, Ce, Al, and Pb and group B consisting of Mn and Co, and a compound of different elements selected from the group consisting of Y, Ba, Ca, Sr, Cd, Cu, and Ag.

As discussed above, according to the present invention, it is possible to realize a high performance composite hydroxide active material with less impaired discharge characteristic, which facilitates charging at high temperatures with exceptional efficiency.

According to the present invention, it is also possible to realize a composite nickel hydroxide positive electrode with less decrease in discharge potential and less impaired discharge characteristic, which facilitates charging at high temperature with good efficiency.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. An active material for an alkaline storage battery comprising a solid solution nickel hydroxide material having additive elements incorporated therein, said additive elements comprising at least one element selected from group A consisting of Fe, Cr, V, Ti, Y, La, Ce, Al, and Pb, and at least one element selected from group B consisting of Mn and Co.

2. The active material for an alkaline storage battery in accordance with claim 1, wherein said group A element and said group B element occupy 3 mol % or more of the total amount of Ni, group A element and group B element, respectively, and the sum of the contents of group A element and group B element is 50 mol % or less.

3. The active material for an alkaline storage battery in accordance with claim 1, wherein the sum of the contents of said group A element and said group B element occupies not less than 10 mol % and not more than 30 mol % of the total amount of Ni, group A element and group B element.

4. A positive electrode for an alkaline storage battery having:

an active material comprising a solid solution nickel hydroxide material containing additive elements incorporated therein, said additive elements comprising at least one element selected from group A consisting of Fe, Cr, V, Ti, Y, La, Ce, Al, and Pb, and at least one element selected from group B consisting of Mn and Co, and a compound of at least one element selected from the group consisting of Y, Ba, Ca, Sr, Cd, Cu, and Ag.

5. The positive electrode for an alkaline storage battery in accordance with claim 4, wherein said compound of at least one element selected from the group consisting of Y, Ba, Ca, Sr, Cd, Cu, and Ag is contained in a range of 0.1 to 5 wt %.

* * * * *